United States Patent
Nayak et al.

(10) Patent No.: US 6,752,865 B2
(45) Date of Patent: Jun. 22, 2004

(54) PROCESS FOR MANUFACTURING OF HIGH IRON HYDRAULIC CEMENT CLINKER

(75) Inventors: Bansidhar Nayak, Orissa (IN); Vibhuti Narayan Misra, Orissa (IN)

(73) Assignee: Council of Scientific and Industrial Research, Rafi Marg (IN)

( * ) Notice: Subject to any disclaimer, the term of this patent is extended or adjusted under 35 U.S.C. 154(b) by 120 days.

(21) Appl. No.: 10/113,175

(22) Filed: Mar. 28, 2002

(65) Prior Publication Data

US 2003/0183130 A1 Oct. 2, 2003

(51) Int. Cl.$^7$ ................................................. C04B 2/10
(52) U.S. Cl. ..................... 106/693; 106/739; 106/745; 106/749; 106/769; 264/333
(58) Field of Search .................. 106/693, 739, 106/745, 749, 769; 264/333

(56) References Cited

U.S. PATENT DOCUMENTS

| | | | | |
|---|---|---|---|---|
| 4,135,941 A | * | 1/1979 | Skalny et al. | |
| 4,219,363 A | * | 8/1980 | Tokar et al. | |
| 4,220,475 A | * | 9/1980 | Tokar et al. | |
| 4,627,877 A | * | 12/1986 | Ogawa et al. | |
| 4,943,323 A | * | 7/1990 | Gartner et al. | |
| 4,990,190 A | * | 2/1991 | Myers et al. | |
| 5,017,234 A | * | 5/1991 | Gartner et al. | |
| 5,437,721 A | * | 8/1995 | Kupper et al. | |
| 5,584,926 A | * | 12/1996 | Borgholm et al. | |
| 5,698,027 A | * | 12/1997 | Borgholm et al. | |
| 6,471,767 B1 | * | 10/2002 | Konczak | |

OTHER PUBLICATIONS

English abstract of FR 276003 Aug. 28, 1998.*
English abstract of RU 2035423 May 20, 1995.*
English abstract of JP 61270241 Nov. 29, 1986.*

* cited by examiner

Primary Examiner—Archene Turner
(74) Attorney, Agent, or Firm—Morgan & Finnegan, LLP

(57) ABSTRACT

The present invention describes a process for manufacture of high iron hydraulic cement clinker in production of cement and cementation binder for application in construction activity and in metallurgical industry for sintering of iron ore fines and making cold bonded briquettes and pellets. The process is cost effective and flexible for utilization of wide varieties of raw material consisting of lime and iron in production of high iron cements for different applications.

12 Claims, No Drawings

PROCESS FOR MANUFACTURING OF HIGH IRON HYDRAULIC CEMENT CLINKER

FIELD OF THE INVENTION

The present invention relates to a process for manufacture of high iron hydraulic cement clinker using a down draft sintering technique.

BACKGROUND OF THE INVENTION

High iron cement clinker is a non-portland type of cement clinker which contains iron ($Fe_2O_3$) to the extent of 40% and above as a major chemical constituent. The cement made from high iron cement clinker clearly possesses high binding strength on hydration. This type of high iron hydraulic cement is usable as a substitute to Portland cement in construction a special cement in sulphate resistance constructions, a metallurgical cement or a binder in briquetting, pelletisation and sintering of iron ore, iron oxide and metal containing fines for iron making and a hydraulic mineral binder for absorbing water soluble metals in the treatment and stabilization of hazardous toxic solid wastes.

Portland and aluminous cements are known cementitious systems in which calcium silicates and calcium aluminates respectively are the major cement mineral phases. Iron ($Fe_2O_3$) content in these cements are very low and ranges 2 to 6% in Portland cement and up to 15% (maximum) in aluminous cement. Iron and iron bearing mineral phases existing in these cementitious systems are quite insignificant quantitavely with respect to cement property.

Chemically and mineralogically the high iron cement is quite different from the Portland and aluminous cements. Iron ($Fe_2O_3$) in high iron cement is beyond the limit of the above two cements. Mainly, the calcium-iron and calcium-alumina-iron type of ferric phases are the major mineral constituents of high iron cement clinker responsible for developing hydraulic property and strength of the cement. Hydraulic property and development of strength of high iron cement largely depend on the mineral structure and degree of solid solution of different ferrite phase, crystallinity and presence of different calcium silicate and other mineral phases. In high iron cement clinker, the formation of different ferrite mineral phases mainly depend on the chemical parameters of calcium, alumina and iron; sintering and cooling conditions. Comparatively, ferrite mineral phases of high iron cement clinker form at a much lower temperature than the calcium silicates of the Portland cement clinkers. In respect to hydraulic property and strength, the performance of high iron cement is also better than the Portland cement.

Lime and iron bearing raw materials are the main source for the manufacture of high iron cement. Owing to the many advantageous qualities like cost effectiveness, energy efficiency and better performance of high iron cement than the Portland cement, the development of suitable processes in the production of high iron cement clinker in the present context has been given more attention.

At present, iron rich solid wastes are abundantly available in different metallurgical, chemical and mining industries. Accumulation of these wastes without proper use is a significant problem in respect of the environmental pollution caused. Thus, use of these types of waste materials may find a suitable value-added application in making high iron cements. Although some research activities have been carried out in past in this area but technological development in the production of high iron cement has not been made significant progress.

Reference is made to the following disclosures:
1. Kimenko Z. G; Tikhonov, V. A. Bobik, G. L; Petrovskaya, N. L.; Dmitrievskii, V. S.; Ozerov, V. M. (USSR). Visn L'Viv. Politekh. Inst. 1975, 95, 98–100 (Ukraine). Production of high iron cement for sintering iron ore concentrate (Chemical Ab.: 1975, 85: 1294451g).
2. Tikhonov, V. A; Klimenko, Z. G; Berezhnenko, E. T.; Zhavoronkova, E. V. (L'Viv. Politekh, Inst. L'Vov, USSR). Tr-Mezhdunar. Kongr. Khim. Tsem., $6^{th}$ 1974 (Pub. 1976), 3, 154–6 (Russ). Edited by Boldyrev, A S.; Stroiizdat: Moscow, USSR. Special highly ferruginous cement (Chemical Abs.: 1977, 86: 110385n).
3. Mehta, P. K. (Univ. of California). High iron oxide hydraulic cement. U.S. Pat. No. 4,036,657 (CI. 106–89, C04B7/02), 19 Jul. 1977, Appl. 598, 411. 23 Jul., 1975 (Chemical Abs.: 1977, 87: 121920e).
4. Buraev, M. L.; Tuzyak, V. e; Shpinova, L. G. (L'Viv. Politekh, Inst., L'Vov, USSR). Synthesis of alumina-iron oxide cement from red slime. Kompleskn Ispol'. Miner. Syr'ya, 1984 (2) 72–75 (Russ) (Chemical Abs.: 1985, 102: 50050h).
6. Feng. Xiuji, Zhu, Yufeng (Wuhan Inst. Build Mater. Wuhan, Peop. Rep. China). Research on an early strength cement containing high content of iron. Congr. Int. Quim. Cemento [An] $8^{th}$ 1986, 2, 285–92 (Eng) (Chemical Abs.: 1988, 109: 78641y).
7. Huo, Xingong; Zhen, Yinchum; Liu, Zhencai; Wang, Baoan; Wang, Suqing; Ruan, Doutian (Benxi Steel Co.) Faming Zhuanli Shenqing Gongkai Shoumingashu. Production of ferrite cement using highly activated slag from revolving furnace steel smelting. CN 87, 100, 826 (CI. C04B7/153), 16 Dec. 1987. Appl. 13 Feb. 1987 (Chemical Abs. 1989, 110: 43938u).

wherein efforts have been made to develop iron rich hydraulic cement clinker using the raw materials such as iron ore, red slime, steel melting slag by adopting conventional cement kilns and by smelting in steel smelting converters.

The drawbacks of the earlier processes are the limitations in the use of various types of iron rich raw materials, the deterioration of refractory life due to the formation of low temperature iron rich liquid phase, the difficulty in maintaining a proper reducing or oxidizing atmosphere and a faster cooling conditions to achieve the desired iron rich hydraulic cement mineral phases, involvement of more process steps to make clinker by using a steel smelting converter, the intensive energy required for the grinding of fused and melted iron rich clinker particles, etc.

OBJECT OF THE INVENTION

The main object of the invention is to provide a process for manufacture of high iron hydraulic cement clinker using down draft sintering technique which obviates the drawbacks as detailed above.

Another object of the invention is to maintain flexibility in the process in order to utilize a wide variety of raw materials, fines, solid wastes etc. containing lime and iron.

Still another object of the invention is to use coke, coal, char and carbon containing solid wastes as the source of fuel in the process.

Yet another object of the invention is to maintain easier raw material processing and sintering steps in the process to eliminate the use of refractories and high temperature melting operations.

Yet another object of the invention is provide an eco-friendly process and to use simpler plant machinery for commercial production in batch and continuous scale.

Yet another object of the invention is to maintain high productivity and low energy consumption in manufacture of high iron cements consisting of 40% iron ($Fe_2O_3$) and above.

SUMMARY OF THE INVENTION

Accordingly, the present invention provides a process for the manufacture of a high iron hydraulic cement clinker using a down draft sintering technique which comprises preparing a homogenous raw mixture of raw materials selected from limestone, lime, lime sludge, lime bearing solid wastes, iron ore, slime red mud, ferruginous bauxite, laterite, clay, iron oxide containing metallurgical and chemical wastes, slag, coke breeze, coal char, carbonaceous sludge, carbon bearing solid wastes and any mixture thereof, pelletising the resultant homogenized raw mixture in the presence of water to prepare granulated particles, sintering and cooling the pelletised granulated particles by down draft sintering technique to convert into clinker, grinding the clinker particles with and without gypsum to make high iron hydraulic cements and binders for different applications.

In one embodiment of the invention, the homogeneous raw mixture is prepared in semi-wet or dry form by blending or grinding, depending on the desired particle fineness.

In an embodiment of the invention, the chemical ratio of $CaO/(Al_2O_3+Fe_2O_3)$, $SiO_2/(Al_2O_3+Fe_2O_3)$ and $(Al_2O_3+Fe_2O_3)$ in the homogenized raw mixture is between 1.3 to 2.5, 0.2 to 0.5 and 0.25 to 0.8 respectively.

In an embodiment of the invention, the particle fineness of the homogenized raw mixture is below 150 mesh (100 micron) size.

In yet another embodiment of the invention, the content of solid carbon ranges 4 to 12% in the homogenized mixture to be used as feed to generate in-situ heat for sintering.

In still another embodiment of the invention, pelletization of the homogenized mixture is done in the in presence of water to make granulated particles below 15 mm sizes consisting of 8 to 15% water.

In still another embodiment of the invention, sintering of the granulated particles is done at a temperature in the range of 1050 to 1450° C. to convert into clinker by down draft sintering, maintaining an operating condition of a 300 to 600 mm in bed height of the granulated particles, 200 to 800 mm water gauge (WG) air suction pressure below the bed, and 15 to 20 mm vertical sintering speed from top to bottom of the bed.

In still another embodiment of the invention, depending on the granulated particle size, the product obtained is cooled between 200 to 1000° C. and 400 to 600° C.

In still another embodiment of the present both sintering and cooling operation in cement clinker formation is within the bed itself and is done in a period of 15 to 30 minutes.

In still another embodiment of the present invention, the sintering hearth is free of refractory lining and attached with scrubbers for cleaning of hot gas carrying dust particles to control pollution during sintering operation.

In still another embodiment of the present invention, the clinkerised lumpy aggregates are crushed for size reduction and then ground with or without gypsum and other additives to make cements and binders for different applications.

In another embodiment of the invention, a mineralizing agent selected from sulphate, fluorine, chlorine bearing minerals and chemical wastes is added to the raw mixture.

DETAILED DESCRIPTION OF THE INVENTION

The process details of the present invention are as follows:

Limestone, lime, lime sludge, lime bearing solid wastes, iron ore, slime red mud, ferruginous bauxite, laterite, clay, iron oxide containing metallurgical and chemical wastes, such as slag, coke breeze, coal char, carbonaceous sludge, carbon bearing solid wastes are the different types of raw materials suitable for use in manufacture of high iron cement clinkers.

Sulphate, fluorine, chlorine bearing minerals and chemical wastes are also usable as mineralizing agent in the process. Iron is a major constituent of the high iron cement wherein iron content is beyond the limit of Portland and aluminous cement. Norms for chemical parameters in designing the raw mix for high iron cement is also different than that for Portland and aluminous cements. Based on the content of CaO, $Fe_2O_3$, $Al_2O_3$, $SiO_2$, carbon etc. of the raw materials and additives are mixed in different portions accordingly to maintain the following essential chemical parameters: 1.3 to 2.5 of CaO $(Al_2O_3+Fe_2O_3)$, 0.2 to 0.5 of $SiO_2$ $(Al_2O_3+Fe_2O_3)$, 0.25 to 0.8 of $Al_2O_3+Fe_2O_3$, 4 to 12% of carbon and with or without mineralizing agent in preparation of high iron cement raw mixtures.

Depending on the particle fineness, the moisture content and the nature of materials, the raw mixture may be prepared in dry or semi dry form by blending or by grinding for complete homogenization. Particle fineness of the homogenized raw mixture is maintained preferable below 100 microns. The homogenized raw mixture is then pelleted in the presence of water to form granules of below 15 mm in size. The condition for pelleting is maintained in such a manner that the pelletized particles retain less than 15% water and possess green strength for handling in sintering operation. Sintering of the pelletised particles is carried out by the down draft sintering system to convert into cement clinkers. Principles of Down Draft Sintering (DDS) system is commercially known in the iron and steel industries for agglomeration of iron ore fines for blast furnace use in making iron.

The granulated material of the cement raw mix is charged into the sintering hearth which is like a pot consisting of grated bars at the bottom. The charge material rests on a false hearth (50 mm thick) layer over the grated bars in the form of a bed ranging from 300 to 600 mm in thickness. The top of the bed of the charred materials in the sintering hearth is ignited by using burners or by using pre-burnt coal or coke to create a heat front. An air suction pressure of between 100 to 1000 mm WG is maintained below the grated bars to move the heat front 15 to 20 mm per minute from the top to the bottom of the bed. The drying by calcination, sintering and then cooling of the material to form the cement clinker takes place on a static bed. The presence of solid carbon within the charge material generates in-situ heating to provide a temperature ranging from 1000 to 1500° C. or higher in the bed. Conversion of the charged bed into cement clinker takes about 15 to 30 minutes of time depending on the height and permeability of the charge bed, the air suction pressure, the sintering temperature etc. The clinker product discharged from the sinter pot is crushed to below 10 mm for storage or ground to make cement.

Based on the raw mix composition and presence of a sulphate, a chloride, or a fluorite bearing additive, the high iron cement clinker produced by the above method contains $C_2F$, $C_4AF$, $C_6AF_2$ and $C_6A_2F$ mineral structures of ferrite compounds, di- and tri-calcium silicates, and calcium sulphoaluminate $(Ca_4Al_3S)$, calcium fluoroaluminate $(C_{11}A—CF_2)$, calcium chloroaluminate $(C_{11}A_7, CCl_2)$, calcium sulphoaluminogerrite $(C_2A_xF_{1-x}S_n)$, [where x varies between 0.1 to 0.8 and n varies 0.05 to 0.5] as the assemblage of different cement mineral phase, wherein C, A, F and S are: [C—CaO, F—$Fe_2O_3$, A—$Al_2O_3$, S—$SO_4$]. Ferrite phases ranging 30 to 70% in association with dicalcium silicate silicate or tricalcium as the primary mineral constituents occur in the high iron cement clinker Other minerals like $C_4AS$, $C_{11}A$—$CaF_2$, $C_{11}A$—$CaCl_2$, and calcium sulpho aluminoferrite also exist in different proportions with the ferrite phase depending the nature of additives and fluxes.

Sintering and cooling operation of down draft sintering (DDS) methods is much faster than the other existing cement clinkerization system, and promotes the maintenance of micro-crystalline phases of the different cement minerals and a higher degree of solid solution of the ferrite minerals in the clinker. High hydraulic strength of cement is related to the composition and crystallinity of various cement mineral phases. Particularly, the high iron cement clinkers made in the present process contain mainly acicular to tabular shape ferrite mineral phases of below 10 micron in size and dicalcium and tricalcuim silicate crystals of below 40 micron in sizes and a solid solution of $C_6AF_2$ and $C_6A_2F$ ferrite mineral structures. Due to the special mineralogical and microstructural characteristics, the strength provided by the microstructural characteristics of the high iron cement clinker, consisting of 40% iron and above, a hydraulic strength of as high as 120 MPa in the cement after 28 days of curing. Further, the formulation of high iron cement clinker is mostly by solid state reaction of particles with minimum fusion which helps to retain spongy and porous character for easier grinding to cement fineness.

Laboratory scale down draft sintering (DDS) system consisting of rectangular box type sintering hearth of size (300×300) mm² cross section area and 500 mm height of capacity of feed 50 to 60 kg of granulated raw mix per batch has been adapted in conducting the experiments at different bed height, suction pressure, sintering and cooling rate on various compositions to optimize the process for commercial production of high iron cement clinker.

The following examples are given by way of illustration and therefore should not be construed to limit the scope of the present invention.

EXAMPLE 1

Dry powdery materials of acetylene plant lime sludge [63.25% CaO], blast furnace (B.F.) dust [46.70% $Fe_2O_3$ 7.24% $SiO_2$ and 30.17% carbon] and additives are mixed to make 50 kg raw material mixture in which the weight ratio of lime sludge and B.F. dust is 2:1. The blended materials are pulverized in a ball mill for homogenization and to maintain below 150 mesh (BSS) particle fineness. The homogenized raw mixture consists of 1.96, 0.21 and 0.31 as the chemical ratio of $CaO/(Al_2O_3+Fe_2O_3)$, $SiO_2(Al_2O_3+Fe_2O_3)$ and $Al_2O_3+Fe_2O_3$ respectively. The homogenized raw mixture is then pelletized in presence of water by a disc granulator to make below 15 mm size granules consisting of 10% water. Bulk density of the green granulated particle is 1250 kg/m³, 50 kg of the green granulated material is charged into a sintering hearth of (300 mm×300 mm) cross—section and 500 mm height like a box to make 450 mm thick bed in a laboratory set up DDS unit. Top of the bed is ignited by burning charcoal on it and 350 mm water gauge (WG) air suction pressure is applied below the charge bed to complete the sintering and cooling operation in 30 minutes to prepare iron cement clinker. Solid carbon present in the pelletised granules generate in situ heat for clinker formation at 1375° C. temperature. 30 kg of iron rich clinker is produced from 50 kg of charge material.

The clinker consist of 59.70% $Al_2O_3$ and 25.5% $Al_2O_3+Fe_2O_3$ as major chemical constituent and 52% iron bearing ferrite compounds and 40% tricalcium silicate as the major mineral phase. The clinker is ground to make cements with and without gypsum. The cement prepared without gypsum possesses 45 to 160 minute of setting time, and 420, 560, 710 kg cm² respectively the compressive strength (1:3 cement and sand mortar ratio) at 3, 7 and 28 days of curing. The cement prepared with 4% gypsum shows 85 to 210 minute setting time and compressive strength of 430, 576, 750 kg/cm² respectively of 1:3 cement and sand mortar cube at 3, 7 and 28 days of curing. Effect of gypsum as a set retarder is very negligible on strength development of the cement. Expansion of the cements is within the limit as per Portland cement. This type of high iron cement is suitable for metallurgical and constructional use.

EXAMPLE 2

Dry powdery materials of acetylene plant lime, Basic Oxygen Furnace (BOF) dust [76.80% $Fe_2O_3$, 3.60% $SiO_2$, 2.85% $Al_2O_3$, 11.08% CaO, 0.15 $TiO_2$, 0.78% ($Na_2O+K_2O$), clay (50.59% $SiO_2$, 20.82% $Al_2O_3$, 14.20% $Fe_2O_3$, 1.65% $TiO_2$) and coke breeze [68% fixed carbon, 29% ash, 3% volatile] are used in different weight percentages to prepare 50 kg raw mixture consisting of 7% solid carbon and 1.48, 0.27, 0.3 as the chemical ratio of $CaO/(Al_2O_3+Fe_2O_3)$, $SiO2/(Al_2O_3+Fe_2O_3)$ and $Al_2O_3+Fe_2O_3$ respectively. Granulated pellets of below 15 mm sizes of the ground mixture are prepared with 12% water by the disc granulator. 50 kg of the granulated pellets is used to make clinker by the laboratory set up DDS system maintaining 400 mm bed height and applying 250 mm WG air suction pressure to complete the sintering and cooling in 28 minutes. Coke breezer present in the granulated pellets generates in situ heat and clinker formation has taken place at 1420° C. temperature. 34 kg of clinker has been obtained from 50 kg of feed.

The clinker contains 53% CaO and 33% $Fe_2O_3$. Mineralogically the clinker consists of acicular pattern of iron rich ferrite minerals of $C_6AF_2$, $C_4AF$ and crystals of tricalcium silicate ($C_3S$) and dicalcium silicate ($C_2S$) of below 40 micron sizes. Cement prepared from this type of clinker shows 120 to 240 minute setting time and compressive strength of 1:3 cement and mortar at 1, 3, 7, 28 days of curing 180, 430, 610 and 780 kg/cm² respectively. The use of gypsum as set retarder in the cement shows less significant effect in respect to setting time and strength. This type of cements is suitable for metallurgical use as well as in building constructions.

EXAMPLE 3

Calcined lime (88% CaO, 4.50% $SiO_2$, 1.80 MgO), iron ore slime (93% $Fe_2O_3$, 1.12% $SiO_2$, 2.17% $Al_2O_3$), lateritic bauxite (38% $Fe_2O_3$, 41.5% $Al_2O_3$, 3.8% $SiO_2$, 1.8% $TiO_2$), char fines (88% fixed carbon), fluorite and gypsum are mixed in the weight percentage of 48, 22, 16, 10.2 and 2 respectively to make 50 kg of raw material mixture. It is then ground in the hall mill to a particle fineness of below 150 mesh (BSS sieve) size. Chemical ratio of CaO ($Al_2O_3+Fe_2O_3$) and $Al_2O_3+Fe_2O_3$ of the raw material mixture is in the order of 1.42, 0.2 and 0.35 respectively. The powdery mixture is granulated with 15% water to make below 12 mm size granules. Then 50 kg of granulated material is used to make clinker by the down draft sintering (DDS) technique at 1400° C. using the 460 mm bed height of the material.

The resultant clinker contains 56% CaO and 34% $Fe_2O_3$ as the major constituents. Different mineral phases of the clinker are $C_6AF_2$, $C_4AF$, calcium silicates ($C_3S$, $C_2S$), $C_{11}A_7CaF_2$) calcium sulpho aluminate ($C_4A_3S$), calcium sulpho alumino ferrite etc. The clinker exhibits very fine crystalline structure of different mineral phases. Cement prepared with addition of 10% gypsum shows faster setting (less than 60 minutes) and very high compressive strength in the order of 510, 700 kg/cm$_2$ in 3, 7 and 28 days of curing. Use of gypsum has got very positive effect inn this type of iron rich cement.

It is inferred that the manufacture of high iron cement clinkers for different applications using various types of raw materials in the present process is quite flexible. Rapid sintering and cooling conditions of the process is a special feature to achieve fine crystalline structure, high temperature solid solutions of ferrite and other mineral phases in the high iron cement clinker and high hydraulic strength of the cement. In addition to the clinker chemistry and mineralogy, the development of high hydraulic, strength of the high iron cement is also related to the cement particle size and content of gypsum as set retarder.

The main advantages of the presence invention are:
1. Use of wide varieties of raw materials, industrial and mining solid wastes, fines, etc. rich in lime and iron, and various types of fluxing materials.
2. Scope for utilization of solid carbon bearing materials like coal, coke, char, waste fines as main source of fuel.
3. Flexibility in raw mix design in manufacture of iron rich cements for various uses.
4. High thermal efficiency in clinker formation due to the presence of in situ carbon within the particle.
5. Rapid sintering and cooling -rate of the sintering system, promotes high degree of solid solution in iron mineral phases and micro-crystallinity in the clinker to achieve better cement property.
6. Minimization of pollution as the sintering system consists of both dry and scrubber for cleaning of gas and dust.
7. High productivity of the sintering system due to low retention time.
8. Cost effective as the sintering system is free of refractory materials.

We claim:

1. A process for the manufacture of high iron hydraulic cement clinker wherein $Fe_2O_3$ is at least 33% using a down draft sintering technique which comprises:

preparing a homogenous raw mixture of raw materials selected from limestone, lime, lime sludge, lime bearing solid wastes, iron ore, slime red mud, ferruginous bauxite, laterite, clay, iron oxide containing metallurgical and chemical wastes, slag, coke breeze, coal char, carbonaceous sludge, carbon bearing solid wastes and any mixture thereof, wherein the chemical ratio of $CaO/(Al_2O_3+Fe_2O_3)$, $SiO_2/(Al_2O_3+Fe_2O_3)$ and $(Al_2O_3+Fe_2O_3)$ in the homogenized raw mixture is between 1.3 to 2.5, 0.2 to 0.5 and 0.25 to 0.8 respectively, with the content of $Fe_2O_3$ in the homogenized raw mixture being in the range of less than 40% and the content of solid carbon in the homogenized raw mixture being in the range of between 4 to 12%, pelleting the resultant homogenized raw mixture in the presence of water to prepare granulated particles, sintering and cooling the pelletized granulated particles by down draft sintering technique to convert into clinker, grinding the clinker particles with and without gypsum to make high iron hydraulic cements and binders for different applications.

2. A process according to claim 1 wherein the homogeneous raw mixture is prepared in semi-wet or dry form by blending or grinding depending on the particle fineness of the raw materials.

3. A process according to claim 1 wherein the particle fineness of the homogenized raw mixture is below 150 mesh (100 micron) size.

4. A process according to claim 1 wherein pelleting of the homogenized mixture is done in the in presence of water to make granulated particles below 15 mm in size and to consist 8 to 15% water.

5. A process according to claim 1 wherein the sintering of the granulated particles is done at a temperature in the range of 1050 to 1450° C. for conversion into clinker by down draft sintering, wherein an operating condition consisting of 300 to 600 mm bed height of the granulated particle, 200 to 800 mm water gauge (WG) air suction pressure below the bed, and 15 to 20 mm vertical sintering speed from top to bottom of the bed is maintained.

6. A process according to claim 1 wherein the product obtained is cooled between 200 to 1000° C. and 400 to 600° C. depending on the granulated particle size.

7. A process according to claim 1 wherein the both sintering and cooling operation in cement clinker formation is within the bed itself and is done in a period of 15 to 30 minutes.

8. A process according to claim 1 wherein the sintering hearth is free of refractory lining and attached to the sintering hearth are scrubbers for removal of hot gas carrying dust particles to control pollution during the sintering operation.

9. A process according to claim 1 wherein the clinkerised lumpy aggregates are crushed and then ground with or without gypsum and other additives to make cements and binders for different applications.

10. A process according to claim 1 wherein a mineralizing agent is added to the homogenized raw mixture and is selected from the group consisting of sulphate, fluorine, chlorine bearing minerals and chemical wastes.

11. A process according to claim 1 wherein the iron ($Fe_2O_3$) content of the homogenized raw mixture is less than 40%.

12. A process according to claim 1 wherein the rate of sintering and cooling respectively varies between 200 to 1000° C. and 400 to 600° C. per minute.

* * * * *